United States Patent [19]

Sengupta

[11] Patent Number: 5,304,309
[45] Date of Patent: Apr. 19, 1994

[54] CYCLIC PROCESS FOR SELECTIVE COAGULANT RECOVERY FROM CLARIFIER SLUDGE

[75] Inventor: Arup K. Sengupta, Bethlehem, Pa.
[73] Assignee: Lehigh University, Bethlehem, Pa.
[21] Appl. No.: 904,434
[22] Filed: Jun. 24, 1992
[51] Int. Cl.$^5$ ............................................. B01D 65/02
[52] U.S. Cl. ................................... 210/636; 210/638; 210/500.42; 210/639
[58] Field of Search ............... 210/638, 400, 401, 677, 210/783, 639, 636, 500.42

[56] References Cited

U.S. PATENT DOCUMENTS

| | | | |
|---|---|---|---|
| 3,872,001 | 3/1975 | Davis et al. | 210/58 |
| 3,910,842 | 10/1975 | Karlson | 210/484 X |
| 3,959,133 | 5/1976 | Fulton | 210/45 |
| 4,067,802 | 1/1978 | Cronberg et al. | 210/21 |
| 4,153,661 | 5/1979 | Ree et al. | 264/120 |
| 4,203,837 | 5/1980 | Hooe et al. | 210/44 |
| 4,334,999 | 6/1982 | Cornwell | 210/638 |
| 4,448,696 | 5/1984 | White, Jr. | 210/211 |
| 4,460,642 | 7/1984 | Errede | 428/283 |
| 4,500,494 | 2/1985 | Scher | 423/24 |
| 4,530,963 | 7/1985 | DeVoe et al. | 525/54.1 |
| 4,612,122 | 9/1986 | Ambrus et al. | 210/638 |
| 4,676,908 | 6/1987 | Clepiela et al. | 210/638 |
| 4,741,831 | 5/1988 | Grinstead | 210/638 |
| 4,902,308 | 2/1990 | Mallouk et al. | 55/16 |
| 5,026,481 | 6/1991 | Paul et al. | 210/638 |

OTHER PUBLICATIONS

W. Waitz, "Ion Exchange in Heavy Metals Removal and Recovery", Amber-Hi-Lites, 162 (Rohm and Haas Co., Philadelphia, PA).
T. Roy, "Chelating Polymers: Their Properties and Applications", Master's Thesis, Lehigh University, Bethlehem, PA, pp. 25-39 (1989).
M. Bishop et al., "Testing of Alum Recovery for Solids Reductions and Reuse", J. AWWA, 79:76 (1987).
D. Cornwell & J. Zoltek, "Recycling of Alum Used for Phosphorus Removal in Domestic Wastewater Treatment", J. WPCF, 49:600 (1977).
Y. Zhu et al., "Toward Separation of Toxic Metal Ions by Chelating Polymers; Some Noteworthy Observations", Reactive Polymers, 13:241 (1990).
W. Holl, "Optical Verification of Ion Exchange Mechanisms in Weak Electrolyte Resin", Reactive Polymers, 2:93 (1984).
G. Schmuckler, "Kinetics of Moving-Boundary Ion-Exchange Processes", Reactive Polymers, 2:103 (1984).
I. Najm et al., "Effect of Particle Size and Background Natural Organics on the Adsorption Efficiency of PAC", J. AWWA, 82:1:65 (Jan. 1990).
A. Sengupta et al., "Metal (II) Ion Binding Onto Chelating Exchangers with Nitrogen Donor Atoms: Some New Observations and Related Implications", Environmental Science & Technology, 25:3:481 (Mar. 1991).
D. Cornwell et al., "Demonstration Testing of Alum Recovery by Liquid Ion Exchange", J. AWWA, 73:6:326 (Jun. 1981).
D. Cornwell et al., "Feasibility Studies on Liquid Ion Exchange for Alum Recovery From Water Treatment Plant Sludges", J. AWWA, 72:1:64 (Jan. 1980).
A. Sengupta et al., "Selective Alum Recovery from Clarifier Sludge", J. AWWA, p. 96 (Jan. 1992).

Primary Examiner—Frank Spear
Attorney, Agent, or Firm—Ratner & Prestia

[57] ABSTRACT

An improved, continuous, cyclic process for selective coagulant recovery from clarifier sludge in water treatment plants. The improvement comprises several steps. First, the pH of the clarifier sludge is adjusted to about 3.5. Next, a composite membrane is provided having a chelating exchanger enmeshed in porous polymeric thin sheets. That composite membrane is placed in contact with the acidified sludge for selectively sorbing metal ion from the acidified sludge onto the composite membrane. The composite membrane, now carrying the metal ion, is withdrawn from contact with the acidified sludge and introduced into a stirred regeneration tank containing acid. In that tank, the chelating exchanger of the composite membrane is regenerated by desorbing the metal ion, thereby recovering the coagulant substantially devoid of organic material and undesirable metals. Finally, the regenerated composite membrane is recycled into contact with more acidified sludge while, at the same time, the acid is recirculated through the regeneration tank. In short, the improved cyclic process recovers alum selectively from clarifier sludge with insignificant carry-over of undesirable substances like organics, manganese, and heavy metals.

31 Claims, 7 Drawing Sheets

CYCLIC PROCESS FOR SELECTIVE COAGULANT RECOVERY FROM CLARIFIER SLUDGE

FIELD OF THE INVENTION

The present invention relates to a selective, cyclic recovery process using composite membranes to extract metal ions from an insoluble hydroxide or salt dispersed in an aqueous solution with high suspended solids content. In particular, the present invention relates to a process for recovering alum (aluminum sulfate) used as a coagulant in potable water purification.

BACKGROUND OF THE INVENTION

Sludge management is a growing problem for water utilities. Because alum constitutes thirty to fifty percent of the total clarifier sludge, recovering it would significantly reduce the amount of solid waste that water utilities must dispose. Moreover, recovered alum can be reused as a coagulant, thereby reducing water treatment operating costs.

Aluminum is not included on the list of priority pollutants issued by the U.S. Environmental Protection Agency. Nevertheless, the toxic effect of free and complexed aluminum species on various aquatic life, including fish and benthic organisms, has been the focus of recent investigation. Consequently, although clarifier sludge is not a hazardous waste, its high aluminum content will prompt closer scrutiny in the future of clarifier sludge disposal.

Many of the sludge-producing water treatment plants in the United States are turbidity removal plants, which account for about seventy percent of all water treated. Water treatment plants use coagulants such as alum and ferric sulfate to remove the turbidity in raw water and produce coagulant sludges containing aluminum, magnesium, and iron hydroxides. The coagulant, an acidic sulfate, must be disposed or recovered. About twenty-five percent of the waste producing plants are water softening plants. They account for about twenty-five percent of all water treated. The problem with sludges is similar in other countries.

The need to eliminate sludge discharges has imposed both an economic and a technological problem on the water supply industry. Recently, sludge processing plants have been constructed to treat coagulant. Most disposal practices involve one or more of four alternatives. Co-disposal of the coagulant with sewage sludge at a waste water treatment plant is one alternative; co-disposal often is impractical because sewer access may be unavailable. Lagooning with and without natural freezing, which requires ultimate disposal of the residue in the future, may be a viable alternative at plants where large tracts of inexpensive land are available. Mechanical dewatering with landfills of residue is a third alternative; it is slow and expensive, especially for plants with a water treatment capacity of less than fifty million gallons per day, and undesirable because land disposal of solid wastes has emerged as a national problem (minimizing the volume of solid wastes is a top environmental priority). Finally, only coagulant recovery, of all the potential methods of sludge treatment, offers the ability to reduce the size of the facilities required and to provide a lower life cycle cost.

Several processes have been developed to recover coagulants, particularly the alum produced from aluminum hydroxide which is dispersed in an aqueous sludge resulting from precipitation or coagulation with alum in potable water clarification. They all have the basic disadvantage that the recovering means can be regenerated and reused only with great difficulty and cost. One process involves a substantial lowering of pH to solubilize the metal ion in a metal hydroxide precipitate by adding acid. See U.S. Pat. No. 3,959,133 issued to Fulton.

In the acid digestion process, sludge, usually from settling basins and filter backwashes, is collected in an equalization tank and subsequently thickened by gravity. The supernatant water from the tank is returned to the plant raw water intake. Acid (typically sulfuric acid) is added to the thickened sludge at a concentration determined by the amount of metal hydroxide in the sludge and the desired level of recovery. The dissolved aluminum, in the form of liquid alum, is separated from the residual solids by a gravity separator and returned to storage for reuse while the residual sludge is disposed of by landfills after neutralization.

The stoichiometry of the reaction, by which clarifier sludge is sufficiently acidified with sulfuric acid and insoluble aluminum hydroxide is dissolved in the form of dilute liquid alum, can be written as follows:

$$2\ Al(OH)_3 3H_2O\ +\ 3H_2SO_4\ +\ 2H_2O\ =\ Al_2(SO_4)_3 \cdot 14H_2O$$
(Sludge)          (Acid)                 (Liquid Alum)

The above equation summarizes the underlying concept of the acid digestion process, which was implemented at the water treatment plant of the city of Durham, N.C. with encouraging results.

The acid process for alum recovery has a number of shortcomings which may preclude water utilities from adopting and applying it. One potentially serious problem is that certain impurities may accumulate in the recovered and recycled alum. The process is nonselective; along with alum, it also recovers other impurities which are soluble under highly acidic conditions or which exist as colloids. If this occurs and the recovered alum is recycled for water treatment, the potable water may suffer degradation. Consequently, the acid process may not be used in areas where such impurities present problems.

Potential impurities include those which can be converted to a soluble form in the acidulation process, such as iron, manganese, chromium, other metals, and those from impure sulfuric acid. The concentration of heavy metals (copper, lead, cadmium, and others) in the clarifier sludge is normally low. That concentration may warrant concern, however, if the sludge is recycled through recovered alum. For example, the manganese concentration is significant in raw water in many areas and is likely to be very high in the recovered alum for the acid digestion process. Tests run at the Durham plant confirms that, in recovered alum, the manganese concentration is as high as 127 mg/g of aluminum. Contrast commercial alum, in which manganese is practically absent. This problem may occur for any element present in ionic or colloidal form in the raw water but which has a low solubility and a high settling rate in the clarifier. Such an element would tend to concentrate in the recovered alum during the acid digestion process.

Other impurities which the acid digestion process typically recovers along with alum include a wide variety of naturally occurring organic materials (humates and fulvates). Should the recovered alum be reused as a coagulant, the concentration of organic matter (trihalomethane precursors) and the potential to form trihalomethane in the treated water would tend to increase in the clarified water.

Researchers have tried extracting solvents using liquid ion exchangers for selective alum recovery. This process uses organic solvents to recover pure, concentrated alum from sludge by liquid ion exchange. The liquid ion exchange is a process step performed after acid is added to the alum sludge and is used to eliminate acid soluble impurities from the recovered alum. Such a process is operationally complex, however, and solvent carryover or entrainment into the recovered alum is unavoidable without incorporating an additional treatment step. Moreover, the economics of liquid-ion exchange have yet to be proven.

Chelating agents are useful both in theoretical and applied chemistry and related fields. Common uses include both qualitative and quantitative analyses, water softening, catalysis, and solution clarification. Chelating agents are particularly useful in treating aqueous effluents to remove metallic impurities.

Typically, chelating agents are used in either liquid ion exchange systems (see U.S. Pat. No. 4,334,999 issued to Cornwell) or packed columns (see W. Waitz, *Ion Exchange in Heavy Metals Removal and Recovery*, Amber-Hi-Lites, 162 (Rohm and Haas Co., Philadelphia, Pa.); T. Roy, *Chelating Polymers: Their Properties and Applications*, Master's Thesis, Lehigh University, Bethlehem, Pa. (1989)). In the former, an organic solution containing the chelating agent is placed in intimate contact with the aqueous solution. Metallic ions are removed when the two phases are separated. Unfortunately, a clean separation of the phases is difficult to achieve; some loss of organic solvent invariably results. In the latter, the aqueous solution passes through a column or "bed" of solid chelating resin, which is often mixed with a solid, inert carrier. Such a process requires extensive pretreatment, however, and cannot handle sludges or slurries which have high solids contents.

The preceding discussion stresses the need for a cyclic, selective, easy-to-operate, efficient, economical coagulant recovery process for water utilities. An object of the present invention is, therefore, to provide an improved and different process for selective removal of coagulant (especially alum) from waste water clarifier sludge without encountering the shortcomings associated with the processes discussed above. A related object is to provide a process in which a metal ion can be extracted directly from an insoluble metal hydroxide or salt dispersed in an aqueous phase containing five to ten percent suspended solids. Further, it is an object of the present invention to provide a process which does not significantly accumulate organic material or heavy metals in the liquid coagulant recovered—as occurs in the acid digestion process. Still further it is an object of the present invention to provide a process which can be operated with relative ease when compared to existing processes.

In addition, it is an object of the present invention to provide a system which can be regenerated and used continuously for long periods of time. Another object is to provide a high surface area system which is compatible with sludge, thereby avoiding the need to pretreat the sludge.

SUMMARY OF THE INVENTION

To achieve these and other objects, and in view of its purposes, the present invention provides an improved, continuous, cyclic process for selective coagulant (e.g., alum) recovery from waste water clarifier sludge. The process comprises several steps. First, the pH of the clarifier sludge is adjusted to about 3.5 (3.0 to 4.0). Next, a composite membrane is provided having a weak acid chelating exchanger (preferably Chelex® 100 or ion exchange beads with carboxylate functional groups) enmeshed in porous polymeric (preferably polytetraflouroethylene) thin sheets. That composite membrane is placed in contact with the acidified sludge for selectively sorbing metal ion (e.g., aluminum(III)) from the acidified sludge onto the composite membrane. The composite membrane, now carrying the metal ion, is withdrawn from contact with the acidified sludge and introduced into a stirred regeneration tank containing acid (e.g, sulfuric acid). In that tank, the chelating exchanger of the composite membrane is regenerated by desorbing the metal ion (e.g., aluminum(III)), thereby recovering the coagulant substantially devoid of organic material and undesirable heavy metals. The regenerated composite membrane is subsequently recycled into contact with more acidified sludge and the cyclic process continues. Aluminum concentration as alum steadily increases in the regeneration tank and, finally, that alum may be recovered and re-used as a coagulant in water treatment plants.

It is to be understood that both the foregoing general description and the following detailed description are exemplary, but are not restrictive, of the invention.

BRIEF DESCRIPTION OF THE DRAWING

The invention is best understood from the following detailed description when read in connection with the accompanying drawing, in which.

DETAILED DESCRIPTION OF THE INVENTION

Figure 1:
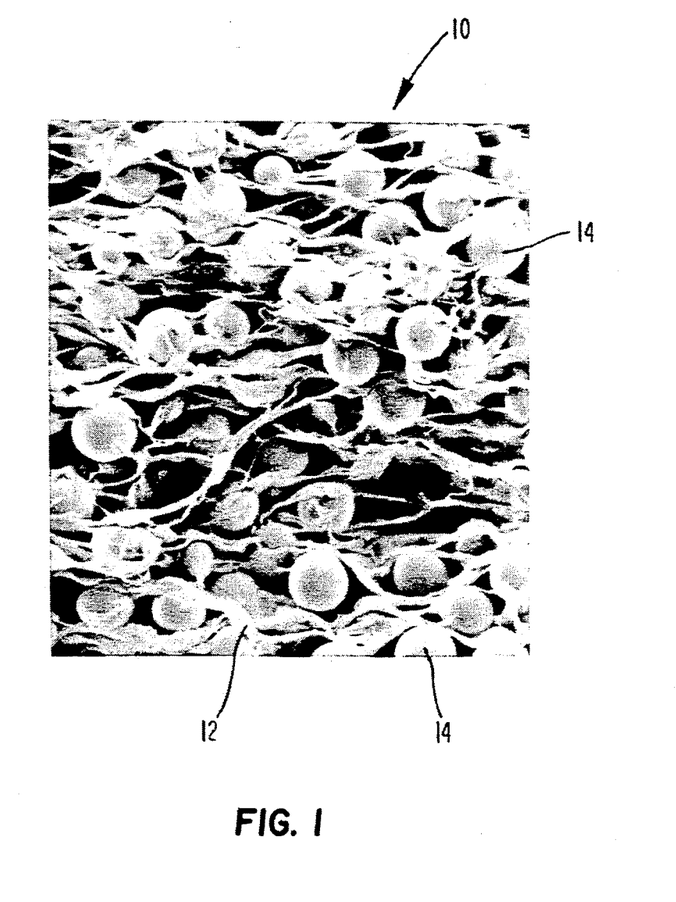
FIG. 1 shows an electron micrograph (300X) (courtesy of L. Errede of 3M Chemical Co. and R. Wood of Biorad Inc.) of a composite membrane used in the process of the present invention.

Referring now to the drawing, wherein like reference numerals refer to like elements throughout, FIG. 1 shows an electron micrograph of a composite membrane 10. Composite membrane 10 includes polymeric thin sheets 12 (0.2–0.5 mm thick), preferably of highly porous (pore sizes varying from 200–4,000 Å) polytetraflouroethylene (PTFE), in which fine spherical beads 14 (about 100 μm in diameter) of polymeric chelating exchangers are physically enmeshed or trapped. The chelating ion exchange functional groups (iminodiacetate moiety) of exchanger beads 14 of composite membrane 10 give exchanger beads 14 a high affinity for aluminum ions.

The thin, sheet-like configuration of composite membrane 10 uniquely qualifies it to treat clarifier sludge with high solids content (1–10 percent weight by volume (w/v)). Moreover, the configuration of composite membrane 10 does not depend stoichiometrically on the amount of aluminum to be recovered from the sludge; composite membrane 10 can be made smaller depending on the cycle time and cycle numbers used in a specific potable water treatment plant.

The chelating agent should be properly selected to meet the needs of the environment in which it is used. Thus, it should be able to form a complex with the metal ion sought to be extracted. Because regeneration is desired, the chelating agent should also be able to release the metal ion under acidic conditions without itself being extracted from the composite membrane. The types of selection required is well within the knowledge of those skilled in the art of chelate chemistry.

Suitable chelating agents to form chelating exchanger beads 14 of composite membrane 10 include XFS® 43084 and XFS® 4195 (available from Dow Chemical, Midland, Mich.); IRC® 50, IRC® 718, and ES® 467 (available from Rohm and Haas Co., Philadelphia, Pa.); Chelex® 100 (available from Biorad Inc. of Richmond, Calif.); and the like. The preferred chelating agents are Chelex® 100 and IRC® 50.

Chelating exchangers in the form of spherical exchanger beads 14 are routinely used in packed-bed columns to remove dissolved metals from liquid wastes which are free of suspended solids. Such columns are unsuitable for clarifier sludge, however, because it has a high content of suspended solids. In addition, use of ion exchanger beads 14 in slurry or fluidized-bed reactors poses operational problems because separating and recovering resin beads from other solids is difficult.

Composite membranes represent a recent development. See U.S. Pat. No. 4,460,642 issued to Errede et al. Such membranes, which include composite membrane 10, can overcome the shortcomings of spherical chelating particles because they have thin, sheet-like, physical configurations. Although PTFE functions well as the thin sheet 12, it constitutes less than twenty percent of the mass of composite membrane 10; ion exchanger beads 14 comprise more than eighty percent of the mass of composite membrane 10. On a mass basis, therefore, the total exchange capacity of composite membrane 10 is comparable to that of exchanger beads 14 alone. Composite membrane 10 is now available commercially for biotechnology-related applications from Biorad Inc. of Richmond, Calif.

Figure 2:
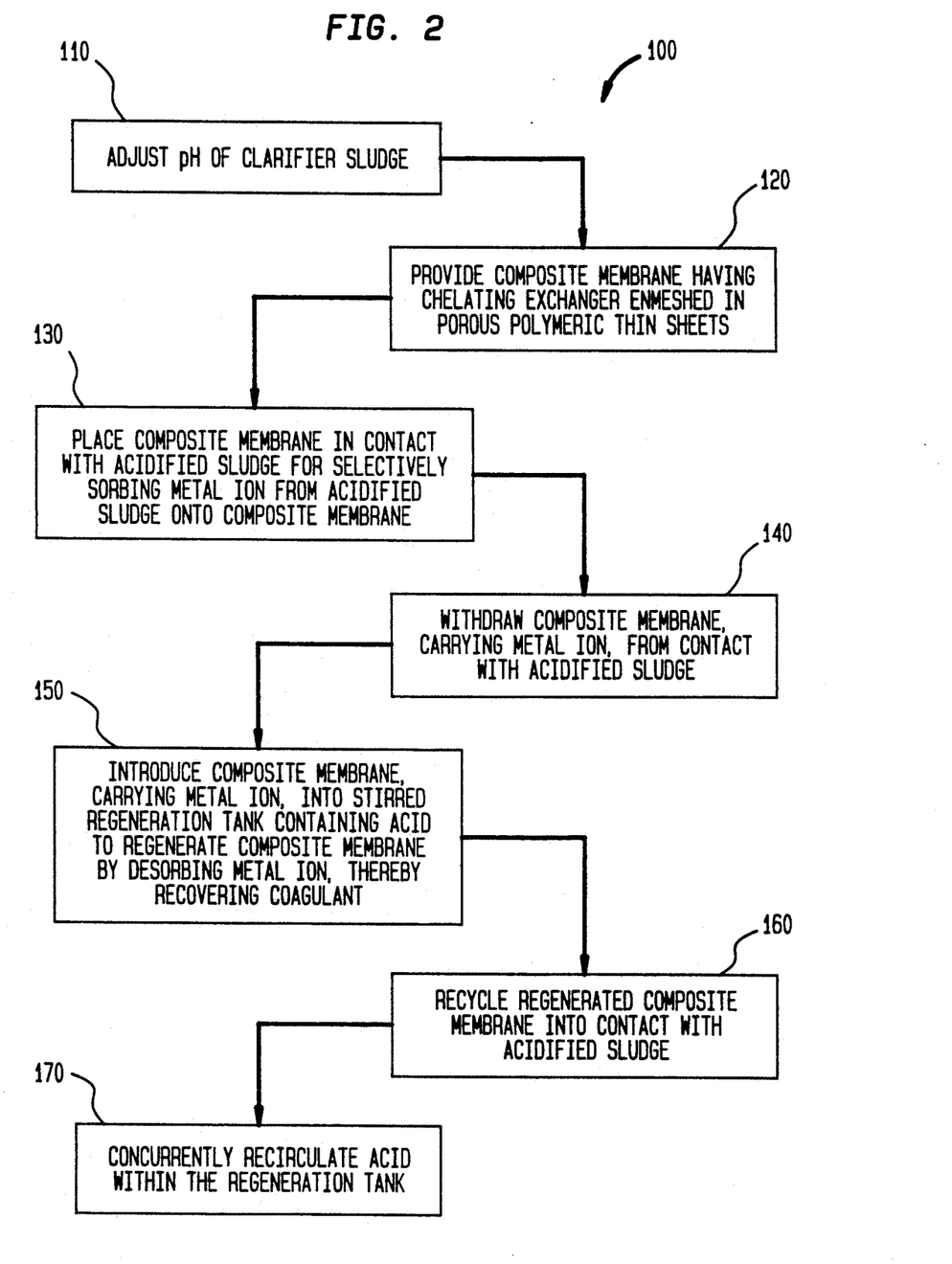
FIG. 2 is a schematic flow diagram of the process of the present invention.
Figure 3:
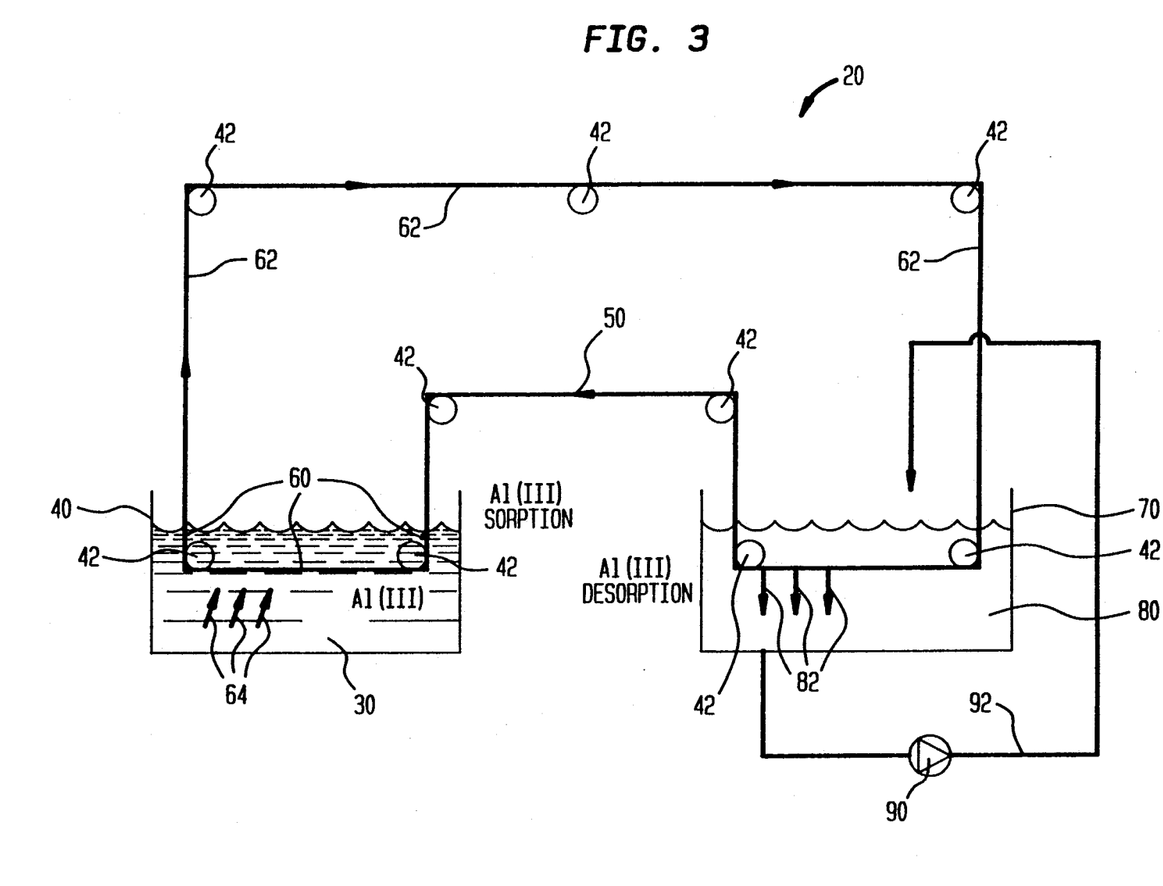
FIG. 3 shows one structural embodiment for alum recovery using the process of the present invention.

FIG. 2 is a schematic flow diagram of the process 100 of the present invention. FIG. 3 shows one structural embodiment, a system 20, for alum recovery using the process 100 of the present invention and illustrates schematically how composite membrane 10 can be used almost continuously to recover alum from clarifier sludge 30. Many alternate structural embodiments are also possible to implement process 100. System 20 easily implements process 100, is not operationally complex, and works best in water treatment plants which, as is typical, discharge sludge 30 only intermittently (two or three times per week).

Sludge 30, typically produced by utilities during water treatment, is stored in a first tank 40; alternatively, sludge 30 may be found in a lake, lagoon, or the like. As an initial step 110 in process 100, the pH of sludge 30 is adjusted (with acid or a weakly acidic gas like $CO_2$) to about 3.5.

Composite membrane 10 can be easily introduced into, and withdrawn from, contact with acidified sludge 30 using system 20. In step 120 of process 100, composite membrane 10 is provided. Composite membrane 10 is provided, in system 20 shown in FIG. 3, as a moving, reinforced belt 50 driven by rollers 42. Composite membrane 10 offers excellent kinetics because of the small particle size of the chelating exchanger beads 14 and the porous structure of the sheets 12.

In step 130, composite membrane 10 is placed into contact with acidified sludge 30. Composite membrane 10 is shown in contact with acidified sludge 30 at contact points 60 in FIG. 3. Composite membrane 10, when suspended in acidified sludge 30 to form contact points 60, selectively removes dissolved aluminum from the aqueous phase by absorbing aluminum(III). Consequently, more aluminum hydroxide precipitates redissolve and aluminum uptake by composite membrane 10 continues until membrane 10 reaches its equilibrium capacity. Arrows 64 in FIG. 3 represent the sorption of aluminum(III) into composite membrane 10.

The two simultaneous reactions occurring in series in first tank 40 can be written as follows:

The overbar represents the membrane phase, in which the polymer matrix R is covalently attached to the chelating iminodiacetate functional group. The overall stoichiometry of the sorption of Al(III) by composite membrane 10 is as follows:

The overall sorption involves selective transfer of Al(III) from one solid phase (clarifier sludge) to another (composite membrane). At a pH of about 3.5, the settling characteristic of acidified clarifier sludge 30 is good and aluminum solubility is also fairly high. See FIG. 4, which is a graph of both dissolved organic carbon (DOC) and dissolved aluminum(III) in sludge from the Allentown, Pa. Water Treatment Plant (hereafter "AWTP") at varying pH levels.

According to the Donnan exclusion principle, composite membrane 10 will reject natural organic matter because of its predominantly anionic characteristic. The chelating polymer ion exchanger beads 14 prefer Al over Na and Ca; accordingly, any significant sorption of Ca and Na into composite membrane 10 is extremely unlikely.

In step 140 (FIG. 2), composite membrane 10, now carrying Al(III), is withdrawn from contact with acidified sludge 30. Composite membrane 10 is shown, as withdrawn from contact with acidified sludge 30, at non-contact points 62 in FIG. 3.

Composite membrane 10 is then introduced, in step 150 (FIG. 2), into a stirred regeneration tank 70 containing two-to-ten percent (preferably five percent) sulfuric acid 80. During step 150, exchanger beads 14 in composite membrane 10 contact acid 80 and are efficiently regenerated, to produce liquid alum, according to the following reaction:

$$3 \text{ R}-\text{N (CH}_2\text{COO}^-)_2.2\text{Al}^{3+} + 3\text{H}_2\text{SO}_4 \Longleftrightarrow 3 \text{ R}-\text{N (CH}_2\text{COOH})_2 + \text{Al}_2(\text{SO}_4)_3$$

Arrows 82 in FIG. 3 represent the desorption of aluminum(III) from composite membrane 10 into regeneration tank 70. Regenerated composite membrane 10 is then withdrawn from regeneration tank 70, in step 160 (FIG. 2), and recycled into contact with clarifier sludge 30 in first tank 40. Steps 120, 130, 140, and 150 are then repeated. Thus, composite membrane 10 can be used continuously to recover alum from clarifier sludge 30. The durability of composite membrane 10 promotes such continuous use. Sulfuric acid 80 is recirculated through regeneration tank 70 by pump 90 and line 92, in step 170, which occurs concurrently with step 160.

In order to compute key design parameters and to identify important process variables for prototype operation, a series of experiments were done.

The salient properties of composite membrane 10, as provided by the manufacturer (Biorad Inc. of Richmond, Calif.), are listed in Table I. Composite membrane 10 was thoroughly washed with deionized water before use. No organic material (dissolved organic carbon) was found in the leachates of composite membrane 10.

TABLE I

| Composition | 90% chelating resin; 10% PTFE (by mass) |
|---|---|
| Pore Size (nominal) | 0.4 micrometers |
| Nominal Capacity | 3 meq/gm membrane |
| Membrane Thickness | 0.2–0.5 millimeters |
| Ionic Form | Sodium |
| Resin Matrix | Styrene Divinylbenzene |
| Functional Group | Iminodiacetate |
| Average Bead Size | 100 micrometers |
| pH Stability | 1–14 |
| Temperature Operating Range | 0–75° C. |
| Chemical Stability | Methanol; 1 N NaOH |

Various properties of Chelex ® 100 chelating beads 14, including the chemical formula of the chelating moiety, used in the experiments are provided in Table II. One gram of composite membrane 10, as supplied, had a surface area of thirty-five square centimeters.

TABLE II

| Composition | R—CH$_2$—N(CH$_2$COOH)(CH$_2$COOH) |
|---|---|
| | (R = Repeating Styrene Monomer) |
| Crosslinker | Divinylbenzene |
| Type | Cation Exchanger (Weak Acid) |
| Physical Form | Spherical Beads |
| Capacity | 3.2 meq/gm |
| Regenerability | Excellent w/Dilute Mineral Acid |
| Application | Selective Removal of Metal Ions |

Clarifier sludge 30 for the experiments was obtained from the AWTP, which uses alum in dosages between 10 and 50 mg/L as a coagulant to treat surface water from the Little Lehigh River. The AWTP had a maximum treatment capacity of 32 mgd. The turbidity of the surface water varies widely during the year (from 680 to 2 ntu in 1989). High turbidity is caused by runoff water following heavy rainfalls. Treatment includes coagulation, flocculation, sand filtration, and chlorination. Besides alum, 2 mg/L of powdered activated carbon (PAC) is applied in slurry form before clarification.

Clarifier sludge 30 is drained intermittently two or three times per week downstream of the river. About 2.0 L of the sludge sample were collected in a bottle from the drain-sample line, immediately transported, and stored in a refrigerator in the laboratory. No biological activity was observed in sludge 30 during the experiments. A portion of the supernatant clear water was drained from the top of the bottle, and the remainder of sludge 30 was used for various experiments. Table III provides the analyses of various constituents in the AWTP sludge 30 for the experiments.

TABLE III

| Substance | Amount (mg/L) |
|---|---|
| Total Suspended Solids | 112,000 |
| Dissolved Calcium | 30.0 |
| Dissolved Sodium | 15.0 |
| pH | 7.1 |
| Total Aluminum* | 5,600 |
| Total Iron* | 1,700 |
| Total Manganese* | 85 |
| Total Zinc* | 23 |
| Total Copper* | 3.2 |
| Total Cadmium* | Negligible |
| Total Organic Carbon* | 860 |

*Analyzed after digestion of sludge for 24 hours at ambient temperature and at pH below 1.0 by addition of concentrated sulfuric acid.

In order to determine the dissolved Al(III) and organic carbon of the treatment plant sludge 30 over a wide range of pH levels, different amounts (always less than 10 mL) of twenty percent NaOH or twenty percent sulfuric acid 80 were added to 200 mL batches of sludge 30. Every batch was subsequently stirred vigorously in a magnetic stirrer pad for at least four hours, the pH was recorded, and the sample was filtered through a 0.45 μm nylon filter. The filtrate was then analyzed for Al(III) and dissolved organic carbon (DOC), which were plotted as a function of pH (see FIG. 4).

Sorption and desorption were carried out in batches using plastic bottles. The pH of 200 mL sludge 30, after necessary dilution with deionized water, was adjusted to 3.5 or 4.0 with concentrated sulfuric acid 80 and put in a plastic bottle (equivalent to the first tank 40 in FIG.

3) to which one or two 47 mm diameter composite membranes 10 were added. A second plastic bottle (equivalent to regeneration tank 70 in FIG. 3) was filled with 2-5 percent sulfuric acid 80. The first bottle was shaken vigorously for 30-45 minutes, after which composite membrane 10 was withdrawn, rinsed with distilled water, and transferred to the second bottle. The second bottle was shaken for 10 minutes and composite membrane 10 was withdrawn, rinsed again with distilled water, and reintroduced into the first bottle. This experimental procedure simulates one cycle of process 100. For large-scale commercial applications, rinsing steps are likely to be redundant because of the large volumes of sludge 30 and regenerant present compared with the amount of composite membrane 10 used.

Depending on the objectives of the experiment, DOC and Al(III), Mn(II), and other heavy metals were analyzed for the solution in the second bottle (recovered alum). The pH in the first bottle remained fairly constant or decreased only slightly over multiple cycles of operation. Adjustment of pH, if necessary, was done using a 5 percent sodium hydroxide solution.

A. Al(III) Sorption At Different pH Levels

Figure 5:
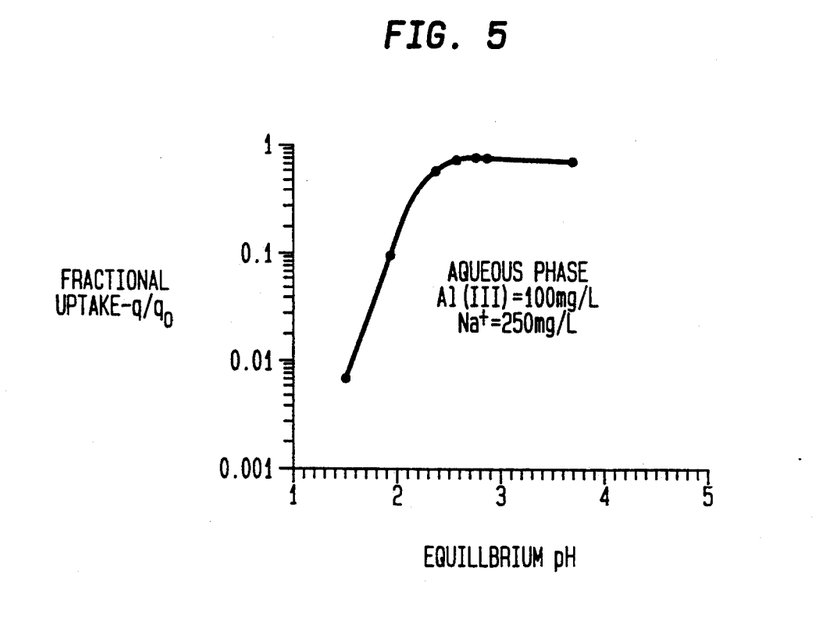
FIG. 5 is a graph of the relative sorption of Al(III) by the composite membrane used in the process of the present invention at varying pH values.

To compare Al(III) sorption capacities of composite membrane 10 at different levels of pH, batch sorption experiments were conducted in which aqueous-phase composition (100 mg Al(III)/L and 250 mg $Na^+$/L) remained identical except for pH. The solutions were prepared using analytical-grade aluminum nitrate and sodium nitrate, and the pH was adjusted with nitric acid. Nitrate salts were used to prevent any undesirable complex formation with Al(III). For every batch, the solution volume (1.0 L) was much greater than the amount of composite membrane 10 added. Consequently, the aqueous-phase Al(III) concentration remained almost constant after twelve hours of vigorous shaking. Composite membranes 10 were subsequently withdrawn, rinsed quickly with deionized water, and regenerated with 100 mL of five percent sulfuric acid 80. Al(III) content in the regenerant was analyzed and Al(III) sorption capacities were subsequently determined from the mass balance. The relative Al(III) sorption (uptake) of composite membrane 10 at varying pH values is shown in FIG. 5.

B. Sorption With Orthophthalate

To identify and assess any possible adsorptive effect of PTFE thin sheets 12 on organic material, batch sorption isotherms (23±2° C.) were developed using analytical-grade orthophthalate, a model compound for natural organic matter. Both composite membrane 10 and chelating exchanger beads 14 were used in the sorption studies at pH levels of 3.0 and 5.0. In a fixed volume (200 mL) of orthophthalate solution of known initial concentration, different weights of composite membrane 10 or chelating exchanger beads 14 were added and equilibrated over twelve hours at a constant pH. Subsequently, aqueous-phase orthophthalate concentrations at equilibrium were analyzed as DOC. Equilibrium orthophthalate sorption capacities for both composite membrane 10 and chelating exchanger beads 14 were computed using mass balance calculations, and the sorption isotherms were plotted for both composite membrane 10 and chelating exchanger beads 14 at different pH levels (see FIG. 6).

C. Batch Kinetics

Al(III) sorption rate studies for composite membrane 10 were conducted at a constant pH of 3.5 in a laboratory-scale batch reactor, which comprised a 250 mL beaker and a computer-aided titrimeter as a pH control system. Both pure reagent-grade aluminum nitrate and the filtrate from AWTP sludge 30 were included in the kinetic studies. A fixed amount of composite membrane 10 was added to the solution phase, and small volumes (normally 5 mL) of samples were collected at different time intervals. With increased Al(III) sorption by composite membrane 10, pH tended to drop but was adjusted automatically and almost instantaneously by adding five percent sodium hydroxide through the microprocessor-controlled titrimeter. During the entire course of the kinetic experiment, vigorous agitation was maintained through both magnetic and motor-driven stirrers to prevent any significant resistance caused by liquid-film diffusion.

For the kinetic study with AWTP sludge 30, the pH of sludge 30 was first adjusted to 3.5 and filtered through 0.22 μm nylon filters. The filtrate was diluted (1:5 dilution with deionized water) and kinetic studies were carried out as described previously. Al(III) sorption by composite membrane 10, $q(t)$, at any time, t, was determined by the following mass balance: $m \cdot q(t) = V[C_0 - C(t)]$, in which V represents the volume of the solution, m is the mass of membrane 10 added, $C_0$ is the initial aqueous-phase Al(III) concentration, and $C(t)$ is the aqueous-phase Al(III) concentration at any time t.

All standards and dilutions in these experiments were prepared using analytical-grade chemicals and distilled deionized water. Cadmium, copper, manganese, iron, and other metals except aluminum were analyzed using an atomic absorption spectrophotometer with either flame or graphite furnace accessories, as applicable. Al(III) analyses were conducted using the spectrophometric technique, eriochrome cyanine R method. The detailed procedure is described in *Standard Methods for the Examination of Water and Wastewater*, American Public Health Association (APHA), American Water Works Association (AWWA), and Water Pollution Control Federation (WPCF) (Washington, D.C., 17th ed., 1989). A spectrophotometer was used to determine the absorbance of various standards and samples. Orthophthalate concentrations were determined as organic carbon using a total organic carbon analyzer with nondispersive infrared detector. Almost 100 percent recovery was observed for all orthophthalate standards.

Figure 4:
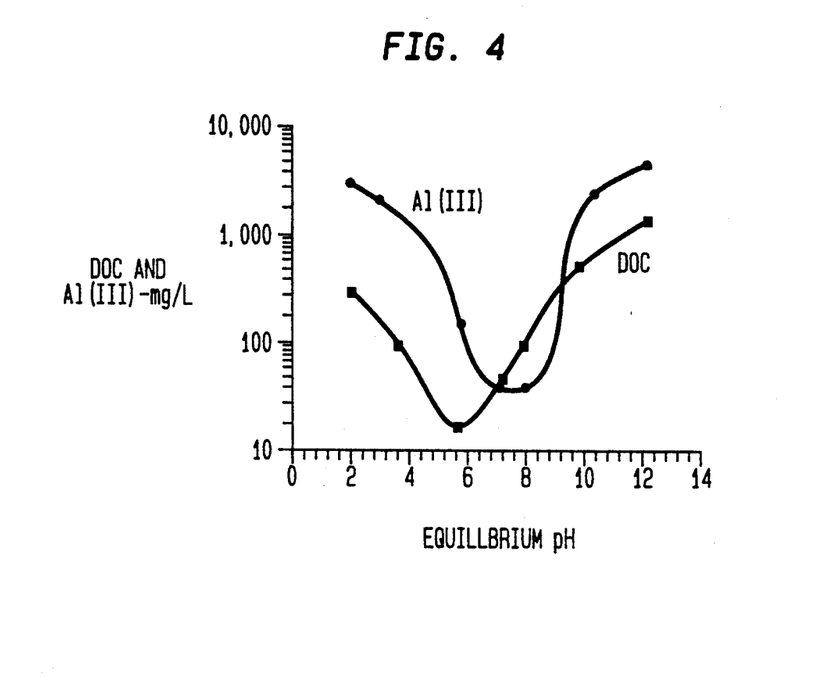
FIG. 4 is a graph of both dissolved organic carbon (DOC) and dissolved Al(III) in sludge at varying pH levels.

FIG. 4 shows both DOC and Al(III) concentrations of AWTP sludge 30 at different pH levels. At around neutral pH (5.0-8.5), the aqueous-phase Al(III) and DOC concentrations are low. At more acidic and alkaline pH levels, their concentrations tend to rise sharply. Because of the amphoteric nature of aluminum oxide (or aluminum hydroxide), both acid and alkali digestions have been tried in an attempt to recover Al(III) from sludge 30. See M. Bishop et al., *Testing of Alum Recovery for Solids Reduction and Reuse*, J. AWWA, 79:76 (1987); D. Cornwell & J. Zoltek, *Recycling of Alum Used for Phosphorus Removal in Domestic Wastewater Treatment*, J. WPCF, 49:600 (1977). Because the DOC tends to increase with dissolved Al(III) under both acidic and alkaline conditions, however, selective Al(III) recovery from sludge 30 is not possible without excessive carryover of organics by these processes. The same trend—high DOC at both acidic and alkaline pH—was observed for clarifier sludge 30 taken from the Easton Water Treatment Plant in Pennsylvania, which uses alum as the primary coagulant and whose source water is the Delaware River.

FIG. 4 also suggests that the partitioning of organics in clarifier sludge 30 is influenced by its sorption or surface complexation onto aluminum hydroxide precipitates. Therefore, when aluminum hydroxide is increasingly dissolved under both acidic or alkaline conditions, organic material is also released into the aqueous phase, resulting in an increase in DOC concentrations.

Figure 7:
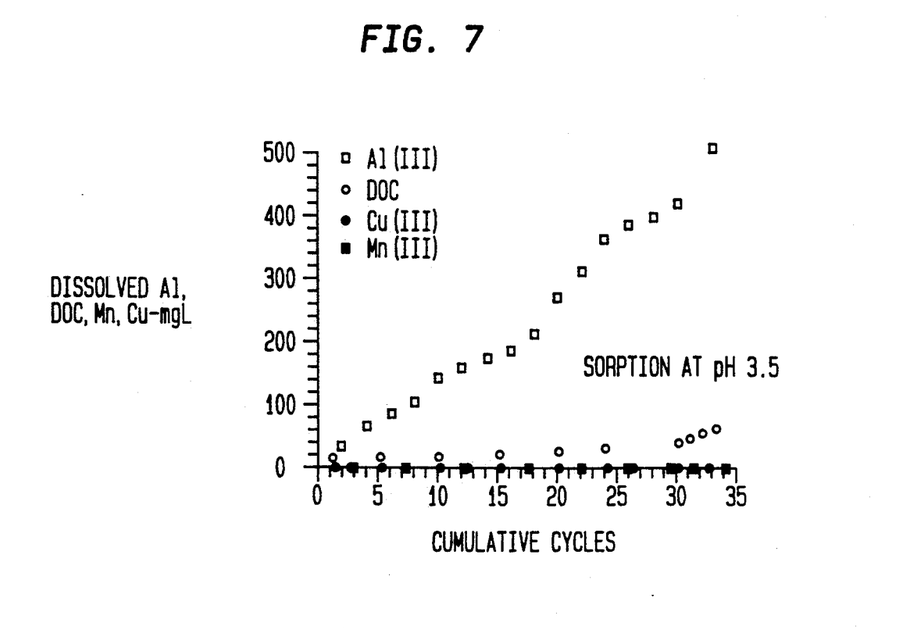
FIG. 7 is a graph of the composition of recovered alum with cumulative cycles of the process of the present invention.

Process 100 was conducted using 200 mL of AWTP sludge 30 after 1:1 dilution. The pH was equal to 3.5 during sorption (step 130), and two percent sulfuric acid 80 was used during desorption (step 150). Al(III), Cu(II), Mn(II), and DOC were analyzed in the acid regenerant after every two or three cycles. FIG. 7 shows their concentrations with cumulative cycles of operation. The concentration of Al(III) increased steadily after every cycle, whereas DOC, dissolved Mn(II), and Cu(II) concentrations remained substantially constant and were much lower than the Al(II) concentration. Thus, process 100 with composite membrane 10 allowed selective passage of Al(III) from sludge 30 to the regenerant with only minor carryover of organic material and undesirable metals, namely manganese and copper.

Process 100 was further applied to a 200 mL batch of sludge 30 for about forty cycles, and the final dissolved Al(III) DOC, Fe(III), Mn(II), and Zn(II) were then analyzed in the alum-rich regenerant. Table IV provides the percentage recovery of every constituent including Al(III); the relative concentration of every constituent is normalized with respect to Al(III) and compared with that in clarifier sludge 30. Al(III) recovery was much higher and Al(III) purity was greatly improved by selective rejection of other constituents, including dissolved metals. Additional experimental evidence is provided below to show that carryover of heavy metals into the recovered alum does not necessarily increase in process 100 when the heavy metals content of sludge 30 increases.

TABLE IV

| Element | Recovery (Percent) | mg Element: 100 mg Recovered Al(III) | mg Element: 100 mg Al(III) in Sludge |
|---|---|---|---|
| Al(III) | 68 | 100 | 100 |
| DOC | 12 | 8 | 36* |
| Mn(II) | 15 | 0.3 | 1.5 |
| Zn(II) | 14 | 0.08 | 0.41 |
| Fe(III) | 10 | 4.7 | 30.3 |

*Based on total dissolved organic carbon at alkaline pH.

Thus, process 100 selectively recovers Al(III) from clarifier sludge 30 while preventing any significant passage of natural organic material, heavy metals, or manganese into the recovered alum.

The ease of regeneration (or desorption) with dilute sulfuric acid 80 is an essential requirement of composite membrane 10 if process 100 is to be viable. FIG. 5 shows fractional Al(III) sorption by composite membrane 10 over a range of acidic pH (1.5-3.9) but at constant concentrations of aqueous-phase Al(III) and competing sodium ions. At pH levels above 2.3, more than eighty percent of the ion exchange sites are occupied by Al(III). At a pH of 1.5, however, Al(III) loading is practically absent because the ion exchange sites are occupied almost entirely by hydrogen ions. The weak-acid iminodiacetate functional groups have high affinities toward hydrogen ions and they are completely protonated at pH levels below 2.0.

The results shown in FIG. 5 suggest that composite membrane 10 is amenable to efficient regeneration with two-to-ten percent w/v sulfuric acid 80, which would correspond to a pH below 1.0. Over the entire experimental pH (1.5-3.9) range, sodium ion sorption by composite membrane 10 was negligible, indicating abundant presence of Al(III) and hydrogen ions over competing sodium ions. Previous work with other chelating ion exchange resins, similar to the Chelex® 100 used in these experiments, has also shown high acid regeneration efficiency for desorption and recovery of heavy metals. See Y. Zhu et al., *Toward Separation of Toxic Metal Ions by Chelating Polymers: Some Noteworthy Observations*, Reactive Polymers, 13:241 (1990).

One concern about process 100 was that the fine colloidal particles and organic macromolecules present in clarifier sludge 30 might clog the network of pores in composite membrane 10. This would affect the Al(III) sorption capacity. The sorption-desorption experiments were conducted, therefore, for multiple cycles using one 47 mm diameter circular composite membrane 10 and a relatively large volume of sludge 30 (about 500 mL) whose pH had been adjusted to 4.0. The contact time during sorption was 45 minutes and Al(III) was analyzed in the acid regenerant after every cycle.

Figure 8:
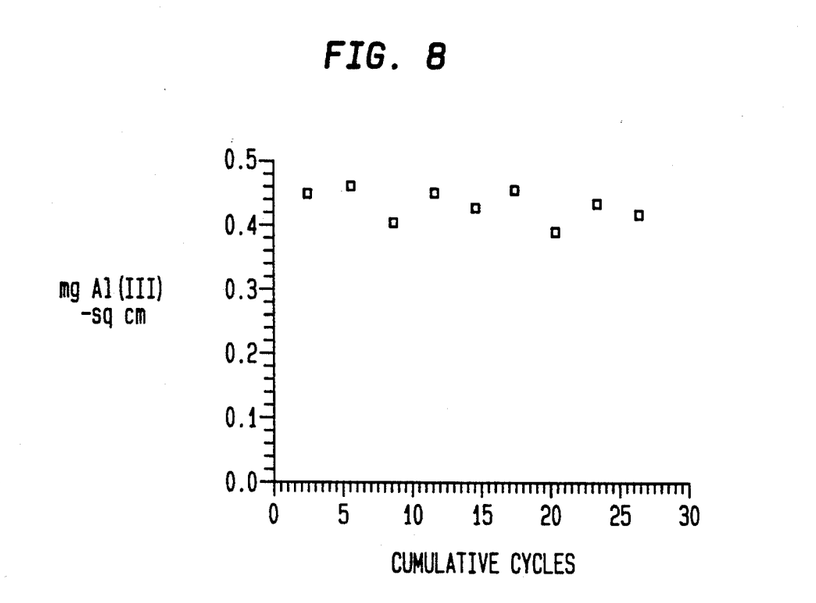
FIG. 8 is a graph showing the effect of increasing cycles on Al(III) sorption capacity, of the composite membrane used in the process of the present invention, from sludge at a pH of 4.0.

FIG. 8 shows Al(III) sorption with increasing number of cycles. The sorption remained unaffected over a period of thirty cycles, indicating the absence of any major fouling of composite membrane 30. The average pore size (4,000 Å) in composite membrane 30 appears to be large enough that the macromolecules cannot irreversibly foul the accessibility to exchanger beads 14.

These preliminary results suggest the durability of composite membrane 10 under varying conditions. Even after thirty cycles of operation with AWTP sludge 30, the Al(III) sorption capacity remained substantially constant. Unlike other membrane processes, such as reverse osmosis, ultrafiltration, and electrodialysis, there is no flow through composite membrane 10 because of pressure or electrical potential gradient. Consequently, fouling by particulate matter or organic macromolecules is unlikely and was not observed during the experiments. Composite membrane 10 is physically robust and can be cleaned with brushes or water jets without degradation.

Carryover of dissolved copper and manganese into the recovered alum for AWTP sludge 30 is minor (FIG. 7). The heavy metals content of clarifier sludge 30 may vary, however, from one plant to another. Thus, experiments were conducted to explore whether any variation in total metals content of the sludge would significantly influence carryover of metals into the recovered alum. The AWTP sludge 30 was spiked with different amounts of cadmium nitrate salts and the pH was adjusted to 4.0. Subsequently, process 100 was conducted with different batches of spiked sludge, for one cycle, and Al(III) and Cd(II) were analyzed in the acid (two percent w/v) regenerant.

Figure 9:
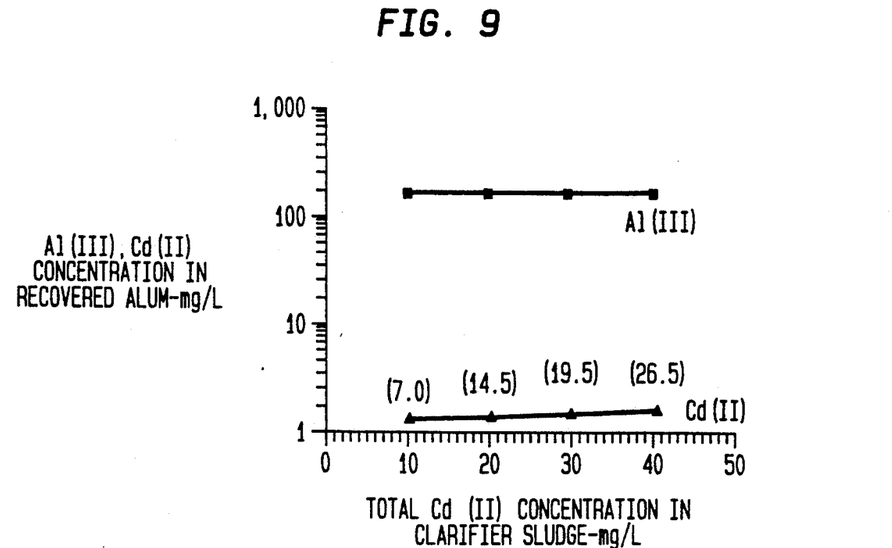
FIG. 9 is a graph of the cadmium carryover into recovered alum from spiked sludge at a sorption pH of 4.0.

The experimental results are depicted in FIG. 9, in which the abscissa (x-axis) corresponds to total cadmium concentration in sludge 30 during sorption step 130 at a pH of 4.0 and the ordinate (y-axis) provides the concentrations of Cd(II) and Al(III) in the recovered regenerant. Numbers in parentheses indicate dissolved aqueous-phase cadmium concentrations in sludge 30 during sorption step 130 for each set. Surprisingly, cadmium concentration in the recovered alum remained almost constant—low despite significant increases in both total and dissolved concentrations of cadmium in sludge 130 after spiking. Such an observation is counterintuitive, and a mechanistic explanation for this observation is provided below. From an application viewpoint, however, such a phenomenon is favorable and suggests that variations in heavy metals content of sludge 130 among treatment plants will not necessarily increase carryover of heavy metals into the recovered alum. Also note that the Al(III) concentration in the acid regenerant was unaffected by the Cd(II) content of the sludge.

Carryover of heavy metals into the recovered alum is low; it is also nearly independent of the heavy metals content of sludge 30. Such a favorable phenomenon is caused by the virtually complete complexation of heavy metals by dissolved organics and a consequent drop in their affinities toward chelating exchanger beads 14.

Because of the fixed negative charges of the functional groups (iminodiacetate moiety), the chelating exchanger beads 14 would tend to reject the primarily anionic natural organic material. The PTFE thin sheets 12 are hydrophobic, however, and occupy about twenty percent of composite membrane 10. Also, ionization of the natural organic matter depends strongly on the aqueous-phase pH because of the predominant carboxylate-type functional groups of the organic matter. Thus, there remains the possibility that natural organic material, especially the non-ionized molecules, will be sorbed by PTFE thin sheets 12, the partly undissociated chelating exchanger beads 14, or both.

To investigate that possibility, batch isotherm experiments were carried out using both chelating exchanger beads 14 and composite membrane 10 under identical experimental conditions. Analytical-grade orthophthalate was used as the organic solute in the absence of any dissolved aluminum or heavy metals. Orthophthalate is a model compound for natural organic matter because it has a good mix of both hydrophobic property (because of its aromatic character) and complexing ability (because of the carboxylate groups). It has the following $pK_a$ values: $pK_1 = 2.9$, $pK_2 = 5.4$.

Figure 6:
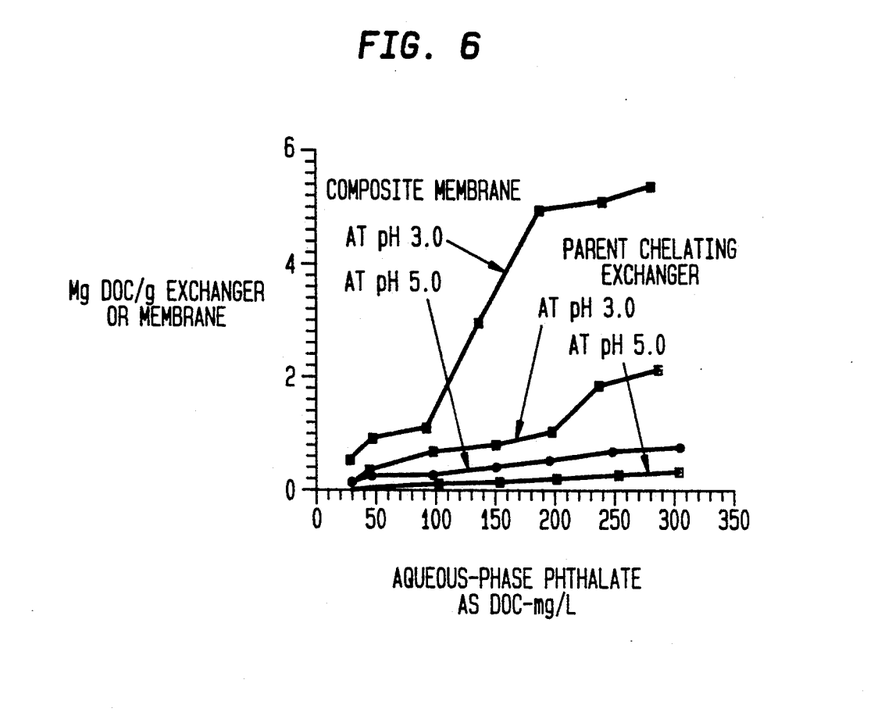
FIG. 6 is a graph of orthophthalate sorption by both the chelating exchanger beads and the composite membrane used in the process of the present invention at two different pH values and at 23±2° C.

FIG. 6 shows the sorption of orthophthalate (expressed as DOC) for both chelating exchanger beads 14 and composite membrane 10 at two different pH levels (3.0 and 5.0). At a pH of 3.0, about half of the orthophthalates would exist as nonionized orthophthalic acid. At a pH of 5.0, orthophthalates would exist solely as a combination of monovalent and divalent anions. At a given pH (3.0 or 5.0), the sorption of orthophthalate by composite membrane 10 is always greater than the sorption by chelating exchanger beads 14. Orthophthalate sorption was greater for both chelating exchanger beads 14 and composite membrane 10 at the lower pH. Although the relative sorption varied significantly with pH and the nature of the sorbent, the total sorption was very low (a maximum of 6 mg DOC/g). An increase in the aqueous-phase orthophthalate concentration at pH 5.0 did not cause any significant increase in the orthophthalate sorption by either chelating exchanger beads 14 or composite membrane 10.

The following conclusions can be drawn from the foregoing observations. First, although small, the amount of PTFE thin sheets 12 in composite membrane 10 enhances sorption of nonionized orthophthalic acid, which may be attributed to PTFE's relatively hydrophobic properties. Second, as pH increases, orthophthalate sorption drops drastically, indicating poor sorption of organic anions into both chelating exchanger beads 14 and composite membrane 10 because of the Donnan exclusion effect.

Previous rate studies on chelating exchangers have established that intraparticle diffusion within the chelating exchanger beads 14 would be the rate-controlling step for Al(III) sorption under process conditions. See W. Höll, *Optical Verification of Ion Exchange Mechanisms in Weak Electrolyte Resin*, Reactive Polymers, 2:93 (1984); G. Schmuckler, *Kinetics of Moving-Boundary Ion-Exchange Processes*, Reactive Polymers, 2:103 (1984). For a spherical particle, the rate of aluminum sorption during the step 130 of process 100 may be expressed as:

$$\frac{\delta q}{\delta t} = \overline{D}\left(\frac{\delta^2 q}{\delta r^2} + \frac{2}{R}\frac{\delta q}{\delta r}\right)$$

in which r is the radial space coordinate (i.e., the distance from the bead center) and $\overline{D}$ is the exchanger-phase aluminum diffusivity.

The competing effects of dissolved sodium and calcium ions are insignificant because of their lower affinities and lower aqueous-phase concentrations compared with dissolved aluminum. Thus, aluminum sorption at a given pH by composite membrane 10 may be viewed as a single-component sorption process. Given this condition, the fractional attainment of equilibrium capacity F can be approximated by the following algebraic equation:

$$F = \frac{q(t)}{q_0} = 1 - \frac{6}{\pi^2}\sum_{m=1}^{\infty}\frac{1}{m^2}\exp{-D\ m^2\ \pi^2 t/(r_0)^2}$$

in which q(t)=Al(III) sorption at any time t in meq or mg/g membrane, $q_0$=Al(III) sorption at equilibrium (i.e., after infinite time), and $r_0$=radius of ion exchanger bead 14. Again, at any time t, q(t) is related to the aqueous-phase Al(III) concentration by the mass balance equation, $V[C_0 - C(t)] = m \cdot q(t)$, in which V, $C_0$, and m are volume of the solution, initial aluminum concentration, and mass of composite membrane 10, respectively.

Figure 10:
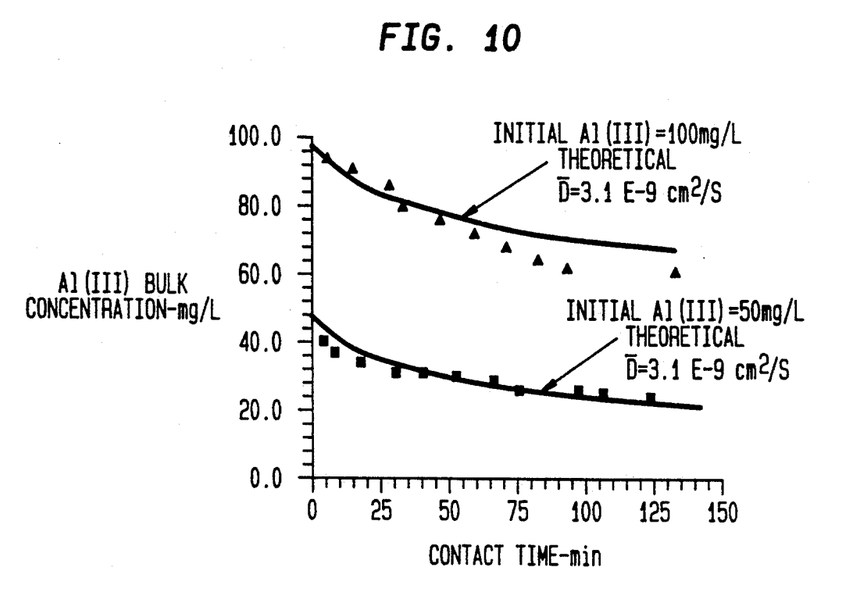
FIG. 10 is a graph illustrating the results (experimental and theoretical) of two batch kinetic studies with different initial Al(III) concentrations.

FIG. 10 provides the results of two batch kinetic studies at pH 3.5 in which the drop in aqueous-phase Al(III) concentration is plotted against time. These two kinetic runs were conducted using analytical-grade aluminum nitrate salts and were identical in every respect (same pH and same concentrations of competing sodium ions) except that the initial concentrations were different (100 and 50 mg Al(III)/L).

For the kinetic run with 100 mg/L initial Al(III) concentration, q(t) was computed for every sample collected using the mass balance equation provided above on Al(III). To compute $q_0$, the kinetic experiment was continued for seventy-two hours when the aqueous-phase Al(III) concentration was analyzed to be 59.4 mg/L. The equilibrium capacity $q_0$ was computed corresponding to this final concentration, and then fractional sorptions (i.e., q(t)/$q_0$) were computed corresponding to different times. Using the equation provided above for the fractional attainment of equilibrium capacity F, and considering an average diameter for exchanger bead 14 to be 100 μm in composite membrane 10, the exchanger-phase aluminum diffusivity was computed by trial and error (solid line in FIG. 10). The value was $3.1 \times 10^{-9}$ cm$^2$/s. The half time, $t_{\frac{1}{2}}$, the time required to attain fifty percent of the equilibrium capacity, was found to be 45 minutes.

To further verify the accuracy of the computed diffusivity and the general applicability of the model, the theoretically calculated Al(III) concentration versus time plot was superimposed (solid line) on the kinetic data for the run with 50 mg/L initial Al(III) concentration. The solid line agrees well with the experimental data. Because the initial Al(III) concentrations for the two kinetic runs were quite different (100 and 50 mg/L), good agreement between model predictions and experimental data also suggest that, in the concentration range of interest, the aqueous-phase Al(III) concentration has an insignificant effect on the diffusivity of the exchanger-phase Al(III).

Figure 11:
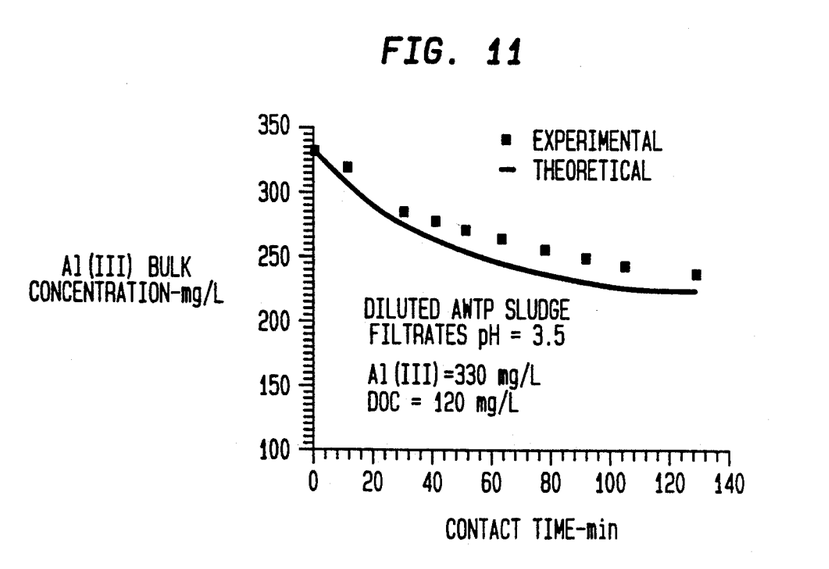
FIG. 11 is a graph illustrating the results (experimental and theoretical) of a batch kinetic study using sludge filtrate.

Similar kinetic experiments were conducted using the filtrate of AWTP sludge 30 after adjusting the pH to 3.5. Initial Al(III) and DOC concentrations were 330 and 120 mg/L, respectively. FIG. 11 provides experimental data points and also the theoretical rate curve (solid line) using Diffusivity=$3.1 \times 10^{-9}$ cm$^2$/s computed from a pure Al(III) solution. Although the basic trend of the Al(III) sorption rate from the sludge filtrate is predicted fairly well by the solid line, the experimental data points are consistently lower than the theoretically predicted values. It is likely that part of the total dissolved Al(III) remains complexed with dissolved organics at pH 3.5 and, consequently, the sorption rate is affected as the DOC/Al ratio in the aqueous phase increases with the sorption of dissolved aluminum onto composite membrane 10.

Based on the magnitude of intraparticle diffusivity and half time, the Al(III) sorption onto composite membrane 10 is reasonably fast and similar to that of other commonly used sorption processes (e.g., removal of organic solutes with packed activated carbon (PAC), see I. Najm et al., *Effect of Particle Size and Background Natural Organics on the Adsorption Efficiency of PAC*, J. AWWA, 82:1:65 (January 1990)). Moreover, a simple kinetic model in which intraparticle diffusion is the rate-limiting step may well predict the Al(III) sorption rate during step 130 of process 100. Al(III) desorption, i.e., acid regeneration kinetics (step 150 of process 100), is, however, much faster and highly favorable thermodynamically. Because of the relatively insignificant impact of regeneration kinetics on the viability of process 100, it was not studied experimentally in any detail.

Although not expected intuitively, cadmium concentration did not increase in the recovered alum with an increase in its aqueous-phase (or sludge-phase) concentration. Al(III) recovery remained, however, essentially constant (see FIG. 9). Carryovers of Cu(II) and Mn(II) were insignificant (FIG. 7), implying almost negligible sorption by composite membrane 10 during step 130 of process 100. These heavy metals are excellent electron acceptors (Lewis acids) and exhibit extremely high affinities toward chelating exchangers. See A. Sengupta et al., *Metal(II) Ion Binding Onto Chelating Exchangers with Nitrogen Donor Atoms: Some New Observations and Related Implications*, Environmental Science & Technology, 25:3:481 (March 1991). The poor sorption of these heavy metals onto composite membrane 10 in process 100 is explained below.

Natural organic matters (humates and fulvates) are excellent ligands (Lewis bases); such ligand characteristics are contributed predominantly by aliphatic and aromatic carboxylate and phenolate moieties. See E. Thurman, *Organic Geochemistry of Natural Waters*, Martinus Nijhoff/D. W. Junk, Publ., Dordrecht, the Netherlands (1985). The protolysis of such weak-acid organic ligands can, in general, be presented as follows: $H_nL \leftrightarrow nH^+ = L^{n-}$. Obviously, $L^{n-}$ (the organic ligand) can form strong complexes with Al(III) and other dissolved heavy metals M(II). The reactions for 1:1 complexes are as follows: $Al^{3+} + L^{n-} \leftrightarrow (AlL)^{3-n}$; $M^{2+} + L^{n-} \leftrightarrow (ML)^{2-n}$. M(II) includes Mn(II), Cd(II), Ni(II), Cu(II), Zn(II), and others.

Obviously, sorption by chelating exchanger beads 14 of both M(II) and Al(III) will be reduced because of parallel competing complexation reactions in the presence of organic ligands in the aqueous phase. Such competitions may be presented in a simplistic way as follows:

in which RL is the solid chelating polymer in composite membrane 10.

Reduction in sorption for a given chelating exchanger under such conditions depends on concentration of ligand in the aqueous phase, metal-ligand stability constants, and pH. The following hypothesis helps explain why carryover of heavy metals into the recovered alum would, in general, be insignificant in accordance with the observations of FIG. 9.

At an acidic pH between 3.0 and 4.0, total dissolved Al(III) concentration in sludge 30 is high (between 300 and 1,200 mg/L) and dissolved heavy metals (e.g., Cd, Ni, Cu) concentrations are low (<10.0 mg/L). Dissolved organic material is present, however, to the extent of 60–120 mg/L as DOC. Thus, the ligand-to-metal ratio is extremely high for heavy metals, which remain well complexed by organics. Consequently, the affinities of heavy metal ions toward the chelating exchangers diminish drastically. On the contrary, because dissolved Al(III) concentration is much greater than DOC, a relatively small fraction of Al(III) exists as Al-organic complex, and $Al^{3+}$ is the predominant Al(III) species in the aqueous phase.

Therefore, among all the cationic species present in the aqueous phase (namely, $Ca^{2+}$, $Na^+$, $Al^{3+}$, cationic Al-organic complex, and cationic M-organic complex), $Al^{3+}$ is by far the most preferred by the chelating exchangers. It is also present at much higher concentrations in the aqueous phase than are the others. Compared with Al(III) sorption, heavy metals sorption during step 130 of process 100 would be insignificant, therefore resulting in only negligible carryover into the recovered alum. Because the relative distributions of Al(III), dissolved organic material, and heavy metals are unlikely to vary widely from one water treatment plant to another, the foregoing observations about AWTP sludge 30 are expected to hold for sludge 30 from other water treatment plants.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

What is claimed is:

1. A cyclic process for selective coagulant recovery from clarifier sludge in water treatment plants comprising the steps of:
   (a) adjusting the pH of said clarifier sludge to about 3.5;
   (b) providing a composite membrane having a weak acid chelating exchanger enmeshed in porous polymeric thin sheets;
   (c) placing said composite membrane in contact with said acidified sludge for selectively sorbing metal ion from said acidified sludge onto said composite membrane;
   (d) withdrawing said composite membrane, carrying said metal ion, from contact with said acidified sludge;
   (e) introducing said composite membrane, carrying said metal ion, into a stirred regeneration tank containing acid to regenerate said chelating exchanger of said composite membrane by desorbing said metal ion, thereby recovering said coagulant substantially devoid of organic material and undesirable heavy metals;
   (f) recycling said regenerated composite membrane into contact with said acidified sludge; and
   (g) recirculating, concurrently with said step of recycling, said acid through said regeneration tank.

2. A process according to claim 1 wherein said step of adjusting the pH of said clarifier sludge includes treating said clarifier sludge with an element selected from the group consisting of acids and weakly acidic gases.

3. A process according to claim 1 wherein said step of providing said composite membrane includes forming said composite membrane as a moving, reinforced belt driven by rollers.

4. A process according to claim 1 further comprising the step of cleaning said composite membrane.

5. A process according to claim 1 wherein said step of placing said composite membrane in contact with said acidified sludge for selectively sorbing metal ion from said acidified sludge onto said composite membrane is performed without flow through said composite membrane because of one of a pressure and electrical potential gradient.

6. A process according to claim 1 wherein said sludge has a suspended solids content of between 1–10 percent weight by volume.

7. A process according to claim 1 wherein said acid contained in said stirred regeneration tank is 2–10 percent sulfuric acid.

8. A process according to claim 1 wherein said chelating exchanger is more than eighty percent of the mass of said composite membrane and said porous polymeric thin sheets are less than twenty percent of the mass of said composite membrane.

9. A process according to claim 8 wherein said chelating exchanger has a high affinity for said metal ions.

10. A process according to claim 8 wherein said porous polymeric thin sheets are polytetraflouroethylene.

11. A process according to claim 10 wherein said chelating exchanger is formed of spherical beads.

12. A process according to claim 11 wherein said spherical beads are approximately 100 micrometers in diameter and said polymeric thin sheets are between 0.2 and 0.5 millimeters thick with pore sizes between 200–4,000 Angstroms.

13. A process according to claim 1 wherein said coagulant is alum and said metal ion is aluminum(III).

14. A cyclic process for selective recovery of alum from clarifier sludge in water treatment plants comprising the steps of:
   (a) adjusting the pH of said clarifier sludge to about 3.5;
   (b) providing a composite membrane having a weak acid chelating exchanger enmeshed in porous polymeric thin sheets;
   (c) placing said composite membrane in contact with said acidified sludge for selectively sorbing aluminum(III) from said acidified sludge onto said composite membrane;
   (d) withdrawing said composite membrane, carrying said aluminum(III), from contact with said acidified sludge;
   (e) introducing said composite membrane, carrying said aluminum(III), into a stirred regeneration tank containing acid to regenerate said chelating exchanger of said composite membrane by desorbing said aluminum(III), thereby recovering said alum substantially devoid of organic material and undesirable heavy metals;
   (f) recycling said regenerated composite membrane into contact with said acidified sludge; and
   (g) recirculating, concurrently with said step of recycling, said acid through said regeneration tank.

15. A process according to claim 14 wherein said step of adjusting the pH of said clarifier sludge includes treating said clarifier sludge with an element selected from the group consisting of acids and weakly acidic gases.

16. A process according to claim 14 wherein said step of providing said composite membrane includes forming said composite membrane as a moving, reinforced belt driven by rollers.

17. A process according to claim 14 further comprising the step of cleaning said composite membrane.

18. A process according to claim 14 wherein said step of placing said composite membrane in contact with said acidified sludge for selectively sorbing aluminum(III) from said acidified sludge onto said composite membrane is performed without flow through said composite membrane because of one of a pressure and electrical potential gradient.

19. A process according to claim 14 wherein said sludge has a suspended solids content of between 1–10 percent weight by volume.

20. A process according to claim 14 wherein said acid contained in said stirred regeneration tank is 2–10 percent sulfuric acid.

21. A process according to claim 14 wherein said chelating exchanger is more than eighty percent of the mass of said composite membrane and said porous polymeric thin sheets are less than twenty percent of the mass of said composite membrane.

22. A process according to claim 21 wherein said chelating exchanger has a high affinity for said aluminum(III).

23. A process according to claim 21 wherein said porous polymeric thin sheets are polytetraflouroethylene.

24. A process according to claim 23 wherein said chelating exchanger is formed of spherical beads.

25. A process according to claim 24 wherein said spherical beads are approximately 100 micrometers in diameter and said polymeric thin sheets are between 0.2 and 0.5 millimeters thick with pore sizes between 200–4,000 Angstroms.

26. A cyclic process for selective recovery of alum from clarifier sludge in water treatment plants comprising the steps of:
(a) adjusting the pH of said clarifier sludge to about 3.5 by treating said clarifier sludge with an element selected from the group consisting of acids and weakly acidic gases;
(b) providing a composite membrane having a weak acid chelating exchanger enmeshed in polytetraflouroethylene porous thin sheets, said chelating exchanger having a high affinity for aluminum(III) and being more than eighty percent of the mass of said composite membrane and said polytetraflouroethylene porous thin sheets being less than twenty percent of the mass of said composite membrane;
(c) placing said composite membrane in contact with said acidified sludge for selectively sorbing aluminum(III) from said acidified sludge onto said composite membrane without flow through said composite membrane because of one of a pressure and electrical potential gradient;
(d) withdrawing said composite membrane, carrying said aluminum(III), from contact with said acidified sludge;
(e) introducing said composite membrane, carrying said aluminum(III), into a stirred regeneration tank containing 2–10 percent sulfuric acid to regenerate said chelating exchanger of said composite membrane by desorbing said aluminum(III), thereby recovering said alum substantially devoid of organic material and undesirable heavy metals;
(f) recycling said regenerated composite membrane into contact with said acidified sludge; and
(g) recirculating, concurrently with said step of recycling, said sulfuric acid through said regeneration tank.

27. A process according to claim 26 wherein said step of providing said composite membrane includes forming said composite membrane as a moving, reinforced belt driven by rollers.

28. A process according to claim 26 further comprising the step of cleaning said composite membrane.

29. A process according to claim 26 wherein said sludge has a suspended solids content of between 1–10 percent weight by volume.

30. A process according to claim 26 wherein said chelating exchanger is formed of spherical beads.

31. A process according to claim 30 wherein said spherical beads are approximately 100 micrometers in diameter and said polytetraflouroethylene porous thin sheets are between 0.2 and 0.5 millimeters thick with pore sizes between 200–4,000 Angstroms.

* * * * *